UNITED STATES PATENT OFFICE.

OSCAR BALLY, OF MANNHEIM, GERMANY, ASSIGNOR TO THE BADISCHE ANILIN & SODA FABRIK, OF LUDWIGSHAFEN, GERMANY.

ANTHRAQUINONE DYE.

SPECIFICATION forming part of Letters Patent No. 673,691, dated May 7, 1901.

Application filed January 23, 1901. Serial No. 44,456. (No specimens.)

*To all whom it may concern:*

Be it known that I, OSCAR BALLY, doctor of philosophy and chemist, a citizen of the Swiss Republic, residing at Mannheim, in the Grand Duchy of Baden, Germany, have invented new and useful Improvements in Anthraquinone Dyes, of which the following is a specification.

In the specifications of Letters Patent Nos. 632,621 and 640,986 I have shown that valuable coloring-matters can be obtained by heating certain halogenized derivatives of 1.5 diamido-anthraquinone with aromatic amins and sulfonating the products thus obtained. I have now discovered that valuable new coloring-matter is also produced when instead of the halogen derivatives of 1.5 diamido-anthraquinone mentioned in the said specifications of Letters Patent other halogen derivatives of 1.5 diamido-anthraquinone, as also halogen derivatives of isomeric diamido-anthraquinones, are heated with aromatic amins under suitable conditions and subsequently sulfonated. These halogenized diamido-anthraquinones can be used either in the isolated state or admixed with one another or with the halogen derivatives of 1.5 diamido-anthraquinone. The initial material for the preparation of my new coloring-matter—that is, the halogen derivatives of the said isomeric diamido-anthraquinones—can be obtained, for instance, by treating a diamido-anthraquinone with chlorin or bromin in the manner set forth in the specifications of Letters Patent Nos. 631,607, 631,608, and 640,986, or in the specification of the English Letters Patent No. 21,572 of 1899—that is to say, by treating a sulfo-acid of diamido-anthraquinone in aqueous solution with a halogen. Further, the chlorination product of 1.5 diamido-anthraquinone described in the specification of Letters Patent No. 640,986, which is soluble in glacial acetic acid, as also its isomers, (in admixture with one another or in the pure condition,) can be used as initial material for the purposes of this invention. These bodies can be obtained by diluting with sufficient water the solutions obtained on chlorinating a diamido-anthraquinone in glacial acetic acid after filtering off the insoluble product simultaneously formed. I will refer to this initial material as product B.

My new coloring-matter can in general be obtained in a manner similar to that set forth in the specifications of Letters Patent Nos. 632,621 and 640,986 by heating the above-defined initial material with a primary aromatic amin, with or without the addition of a solvent or diluent; but when employing product B the working up of the melt is somewhat different, as will hereinafter be explained.

The properties of my new coloring-matter as obtained from the various initial products are given in the following table:

| Condensation product from— | Solution in anilin. | Solution in nitrobenzene. | Solution in concentrated sulfuric acid, (containing about 96 per cent. $H_2SO_4$.) | | |
|---|---|---|---|---|---|
| | | | Cold. | At a temperature of 100° centigrade. | At a temperature of 100° centigrade, with the addition of boric acid. |
| 1. 1.8 diamido-anthraquinone bromid (prepared as described in Example 2 of complete specification of English Letters Patent No. 21,572 of 1899) + paratoluidin. | Blue-green | Blue-green | Brown-olive | Violet | Blue. |
| 2. 1.8 diamido-anthraquinone bromid (prepared as described in Example 2 of complete specification of English Letters Patent No. 21,572 of 1899) + anilin. | Blue | Blue | Blackish violet | do | Green-blue. |
| 3. 1.3 diamido-anthraquinone bromid (prepared as described in Example 2 of complete specification of English Letters Patent No. 21,572 of 1899) + anilin. | Green-blue | Blue-green | Dirty violet | do | Do. |
| 4. 1.8 diamido-anthraquinone chlorid (prepared as described in specification of German Patent No. 104,901) + paratoluidin. | Green | Green | Black-brown | Dirty violet | Dirty green. |
| 5. Crude diamido-anthraquinone bromid (prepared from crude diamido-anthraquinone according to Example 2 of complete specification of English Letters Patent No. 21,572 of 1899) + paratoluidin. | Green-blue | Green-blue | Violet-brown | Reddish violet | Blue. |
| 6. 1.5 diamido-anthraquinone chlorid + anilin. (Coloring-matter A of Example 2.) | Gray-blue | Green | Olive-green | Violet | Pure blue. |
| 7. 1.5 diamido-anthraquinone chlorid + anilin. (Coloring-matter B of Example 2.) | Green-blue | Bluish green | Green | Dirty blue | Green-blue. |

In the sulfonated form my new coloring-matter is soluble in water and dyes unmordanted wool or wool mordanted with chrome blue to green shades.

The coloring-matter which I desire to claim specifically is that which can be obtained from crude diamido-anthraquinone bromid and paratoluidin according to this invention and some of whose properties are set forth in column five (5) of the foregoing table. In the sulfonated form it is soluble in water and dyes unmordanted wool and wool mordanted with chrome blue-green shades.

The following examples will serve to show how my invention may be carried into practical effect; but I do not confine myself to the details therein given. The parts are by weight.

*Example 1—Production of coloring-matter from 1.8 diamido-anthraquinone and paratoluidin.*—To about ten (10) parts of paratoluidin which have been heated until liquid add while stirring one (1) part of the bromination product of 1.8 diamido-anthraquinone, (obtainable by brominating the sulfoacid of 1.8 diamido-anthraquinone in the presence of water. See Example 2 of the complete specification of application for English Letters Patent No. 21,572 of 1899.) Heat the melt until it boils. It is at first red. Maintain the heat until it becomes blue-green, and no further change of color takes place. Allow the melt to cool and treat it with alcohol. The coloring-matter can readily be obtained in the crystalline form and converted by sulfonation into a soluble coloring-matter.

*Example 2—Production of a coloring-matter from product B and anilin.*—Add one (1) part, by weight, of product B to ten (10) parts, by weight, of anilin. Keep the whole thoroughly cool while mixing. A brown solution results. Heat this slowly until it boils and maintain the heat until the color of the melt no longer changes. Allow the melt to cool. Add thirty (30) parts, by weight, of alcohol, (containing about ninety-six (96) per cent. of $C_2H_5OH$,) boil up, and allow to stand for twenty-four (24) hours. A coloring-matter separates out. I have referred to it as coloring-matter A in the table. Collect this by filtering. Dilute the filtrate with thirty (30) parts of alcohol and again allow the whole to stand for twenty-four (24) hours. A second condensation product separates out. I have referred to it in the table as coloring-matter B.

Now what I claim is—

1. The new coloring-matter which can be derived from a hereinbefore-defined halogen derivative of diamido-anthraquinone and an aromatic amin which in the unsulfonated form is soluble in anilin and nitrobenzene the solution being blue to green, and which with cold concentrated sulfuric acid gives a brownish to green color which on heating to one hundred (100°) degrees centigrade becomes violet to blue, this color on addition of boric acid changing from blue to green, and which in the sulfonated form is soluble in water and dyes unmordanted wool or wool mordanted with chrome blue to green shades, substantially as hereinbefore described.

2. The new coloring-matter which can be derived from crude diamido-anthraquinone bromid and paratoluidin, which in the unsulfonated form is soluble in anilin and nitrobenzene the solution being green-blue and which with cold concentrated sulfuric acid gives a violet-brown solution, which on heating to one hundred (100°) degrees centigrade becomes reddish violet, this color on addition of boric acid changing to blue, and which in the sulfonated form is soluble in water and dyes unmordanted wool or wool mordanted with chrome blue-green shades.

In testimony whereof I have hereunto set my hand in the presence of two subscribing witnesses.

OSCAR BALLY.

Witnesses:
 WILH. BERNS,
 JOHN L. HEINKE.